United States Patent [19]

Knost et al.

[11] Patent Number: 5,242,698
[45] Date of Patent: Sep. 7, 1993

[54] PROCESS AND APPARATUS FOR CONTROLLING A DOUGH MAKING MACHINE

[75] Inventors: Dieter Knost, Fichtenau; Gerd Kock, Dinkelsbühl, both of Fed. Rep. of Germany

[73] Assignee: Werner & Pfleiderer GmbH, Stuttgart, Fed. Rep. of Germany

[21] Appl. No.: 991,150

[22] Filed: Dec. 16, 1992

[30] Foreign Application Priority Data

Dec. 24, 1991 [DE] Fed. Rep. of Germany ....... 4142931

[51] Int. Cl.$^5$ ........................... A21C 5/00; A21D 6/00
[52] U.S. Cl. ..................................... 426/231; 425/135; 425/168; 425/238; 426/496; 426/503
[58] Field of Search ....................... 426/231, 496, 503; 425/135, 168, 238

[56] References Cited

U.S. PATENT DOCUMENTS 4,786,517  11/1988  Pinto ................................... 426/503

FOREIGN PATENT DOCUMENTS 3720495  4/1991  Fed. Rep. of Germany .
3234487  8/1991  Fed. Rep. of Germany .

*Primary Examiner*—George Yeung
*Attorney, Agent, or Firm*—Ladas & Parry

[57] ABSTRACT

Dough processing method and apparatus in which a head machine has a dough divider for producing successive dough pieces, one after the other, and a conveyor for conveying the dough pieces from the dough divider to a subsequent treatment device A first drive motor drives the dough divider and the conveyor. The subsequent treatment device has a transport conveyor with dough cups for receiving the dough pieces from the conveyor of the head machine at a transfer station and for transporting the dough pieces in the subsequent treatment device A second drive motor drives the transport conveyor. A frequency convertor is connected to the first drive motor to control the speed of operation thereof based on a selected frequency from the frequency convertor. A first switch interrupts the drive of the first drive motor when the conveyor in the head machine is in a position in readiness for transfer of a dough piece to the transfer conveyor and a second switch sends a restart signal to the first drive motor when the transport conveyor is in a position to receive the dough piece. The second drive motor can also be operated by a frequency convertor to control its speed so that the speeds of the conveyor of the head machine and the transport conveyor of the subsequent treatment device are equalized at the transfer station during transfer of the dough pieces.

16 Claims, 5 Drawing Sheets

PROCESS AND APPARATUS FOR CONTROLLING A DOUGH MAKING MACHINE

FIELD OF THE INVENTION

The invention relates to a process and apparatus for controlling a dough making machine and more particularly, a head machine from which dough pieces are supplied to a subsequent treatment device such as a dough fermentation chamber.

BACKGROUND AND PRIOR ART

Systems consisting of a head machine and subsequent treatment device for processing pieces of dough are well-known in commercial and industrial baking technology.

The head machine consisting of a dough divider and a dough shaper or rounder has an operating speed which has to be coordinated with one or more fully automatic or semiautomatic subsequent treatment devices, for example a fermenting chamber, a baking oven, a dough roller, or the like.

Different drive systems are known in this field that vary from a central drive for the entire system equipped with a chain or universal drive and clutch, and individual drive means for each machine that can be turned on and off by spring-loaded brakes or high-power clutches, or drives that turn off the power supply to a high speed electric drive motor by means of costly electronic systems involving speed comparison, for making the entire system run synchronously and deliver the dough pieces precisely from one stage to the next.

In order to provide economical production, it is necessary for such dough-processing systems to be able to process different types of dough and different size of dough pieces. However, this necessarily results in changed cycle times for the head machine, which, for example, become necessary when fermentation times in the fermentation chamber are changed, different doughs with different dough consistency are utilized, or a different treatment device follows the head machine.

The change of cycle time of the head machine is achieved by a speed change, e.g. in the gear transmission or by shortening or lengthening the pauses between transport strokes of the conveyor piston of the dough divider which presses the dough into the measuring chambers thereof. The compressive pressure of the conveyor piston is in the fact designed to be adjustable by spring elements or hydraulic systems corresponding to the particular type of dough, but since the conveyor piston reaches its cycle frequency immediately, the total pressure is developed immediately and is instantaneously transmitted to the dough. Such systems can be driven synchronously and periodically to process dough pieces and are described, for example, in DE-PS 37 20 495 and DE-PS 32 34 487.

The head machine described in DE-PS 32 34 487 comprises a dough divider and rounder of drum design. The dough pieces are delivered by this head machine in successive rows and are transferred by distributor belts to an operating belt. At the end of the operating belt, the dough pieces are transferred to a conveyor belt therebelow equipped with product carriers. The advance of the conveyor belt is variably controllable by its own drive motor which is turned on by a switch during the passage of each row of dough, and is turned off again after a certain interval. A series of plate cams is provided on a control shaft for this purpose, each of which acts in combination with a control switch that is controllable through a program switch. The separation of the dough pieces on the product carrier can thereby be changed and thus the system can be adapted easily to different type of dough pieces depending on the output of the head machine.

The drive control of the head machine in this case is not adjustable and is not combined with an exact placement of the dough pieces on the product carrier. A drawback here is that several intermediate transport devices and transfer devices are necessary for transferring the dough pieces from the distributor belts of the head machine into the fermentation chamber and thus inaccuracies and relatively high wear necessarily result.

SUMMARY OF THE INVENTION

An object of this invention is to provide a process in the dough making art by which an extremely gentle dough division is obtained in the head machine optimally adapted to the particular type of dough being treated, as well as synchronous operation of both the head machine and subsequent treatment device in all operating conditions, particularly when starting up or restarting the system.

The above and other objects of the invention are met by a process in which the head machine produces successive dough pieces, one after the next, which are conveyed on a conveyor to the subsequent treatment device where they are received from the conveyor and transported for treatment therein The transfer of the dough pieces from the head machine to the subsequent treatment device is effected at a transfer station, the conveyor in the head machine being driven by a first drive motor and the conveyance of the dough pieces in the subsequent treatment device being effected by a second drive motor.

In accordance with the invention, the speed of the first drive motor is controlled as a function of a frequency selected by a frequency converter connected to the first drive motor and the operation of the drive of the first drive motor is interrupted by a stop pulse when the conveyor is in a position for transfer of a dough piece to the subsequent treatment device. A restart signal is sent to the first drive motor when the subsequent treatment device is in a position to receive the dough piece from the head machine.

Gentle operation and low-wear operation of the head machine is achieved by the process of the timed control of the drive motor of the head machine pursuant to the invention. At the same time, a method of operation that is extremely gentle to the dough is made possible depending on the particular type of dough, by transmission of the motor torque along an adjustable increasing slope. Synchronous operation of the head machine and of the subsequent treatment device is also achieved in any operating state, even when starting up or restarting the system, for example, after halting the machine for an emergency. The head machine can be adapted easily to any desired subsequent treatment device with adjustable or rigid drive by the drive system according to the invention. Gentle division of all types of dough, from fruit doughs to doughs with prior lengthy fermentation, can be achieved with no problems.

In the time interval of the operating cycle of the subsequent transfer device, which governs the operating cycle of the head machine, the individual parameters for the transmission of torque can be varied.

In further accordance with the invention, the speed of the second drive motor is controlled by a second frequency converter and a control means acts on both the first and second frequency converters in order to equalize the speed of the conveyor of the head machine and the speed of transport in the subsequent treatment device at said transfer station at the instant of transfer In this way, optimal matching of the speeds of the entire system is obtained and 100% transfer accuracy is achieved.

Preferably, the control means is a memory programmable control which activates a set of parameters in the first frequency converter in order to establish the individual time periods of operation of the first drive motor in a complete operating cycle, including the time interval of acceleration, the time interval of running at operational speed, the time interval of deceleration, and any time interval of total halting of the first drive motor. Each of the time intervals can be set by the parameters activated in the first frequency converter. Accordingly, beneficial coordination of the operating speed of the motor and the production of the dough pieces can be obtained Specifically, limitation of motor current and thus of torque, can be regulated depending on the desired operating speed and the composition of the dough.

Moreover, by controlling the individual time intervals for the operation of the first drive motor, smaller systems suitable, for example, for specialized bakeries can be particularly enhanced since rapid changes can be made in the case of different doughs and the like.

By way of example, the acceleration interval can be made relatively long to provide a slow pressure build up in the delivery chamber of the dough divider. In accordance with the consistency of the dough, the operating time interval of the drive motor can be relatively short and followed by a relatively long deceleration interval after which the drive motor is halted for a time interval which is a function of the total time consumed before the next starting pulse from the subsequent treatment device.

In another operational condition, the drive motor does not stop and the deceleration interval is relatively short, whereby an almost continuous operation of the head machine is obtained.

The invention also is directed to dough processing apparatus having a head machine and a subsequent treatment device as described hereinbefore, wherein a frequency converter means is connected to the first drive motor in the head machine for controlling the speed of operation thereof based on a selected frequency from the frequency converter means and a first switch means is operated to interrupt the drive of the first drive means when the conveyor means for the dough pieces in the head machine is in a position for transfer of the dough pieces to the transfer means of the subsequent treatment device and a second switch means is provided for sending a restart signal to the first drive means when the transport means is in a position to receive the dough pieces from the conveyor means.

The apparatus makes low-wear and smooth running of the head machine possible With stepwise operation of the head machine, no high-power clutch is necessary to constantly turn a continuous drive on and off, nor is a spring-loaded brake necessary on a gear reducer motor with start and stop operation. According to the invention, the drive motor operates in acceleration and deceleration intervals which can be adjusted Namely, the acceleration time can be adjusted so that the pressure on the dough in the dough divider builds up slowly and the dough is compressed into the measuring chamber in an adjustable cycle time. The transfer of the dough pieces from the head machine to the subsequent treatment device is synchronized for all operating states since the head machine is started in each operating cycle as a function of the precise delivery position in the subsequent treatment device and the speed of the dough divider is thus regulated as a function of the speed of the subsequent treatment device with the individual cycle times of the delivery piston within an operating cycle being adaptable to the particular type of dough.

DETAILED DESCRIPTION OF PREFERRED EMBODIMENTS

Figure 1:
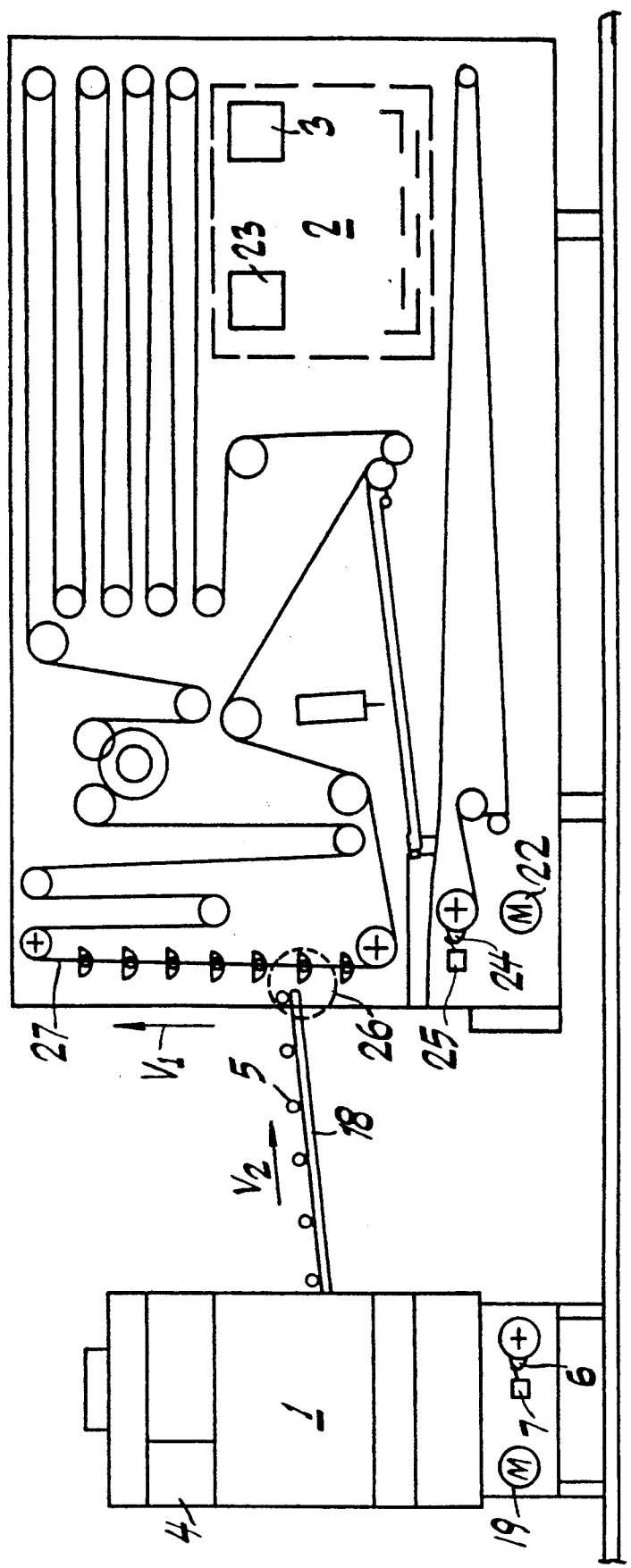
FIG. 1 is a schematic illustration of a head machine and a subsequent dough fermentation chamber.

FIG. 1 of the drawing shows a head machine 1 for dividing a mass of dough into separate pieces 5 and for supplying the pieces to a subsequent treatment device, which in FIG. 1 is a fermentation chamber 2, in which the dough pieces 5 are caused to rise by fermentation of the yeast in the dough products.

Figure 2:
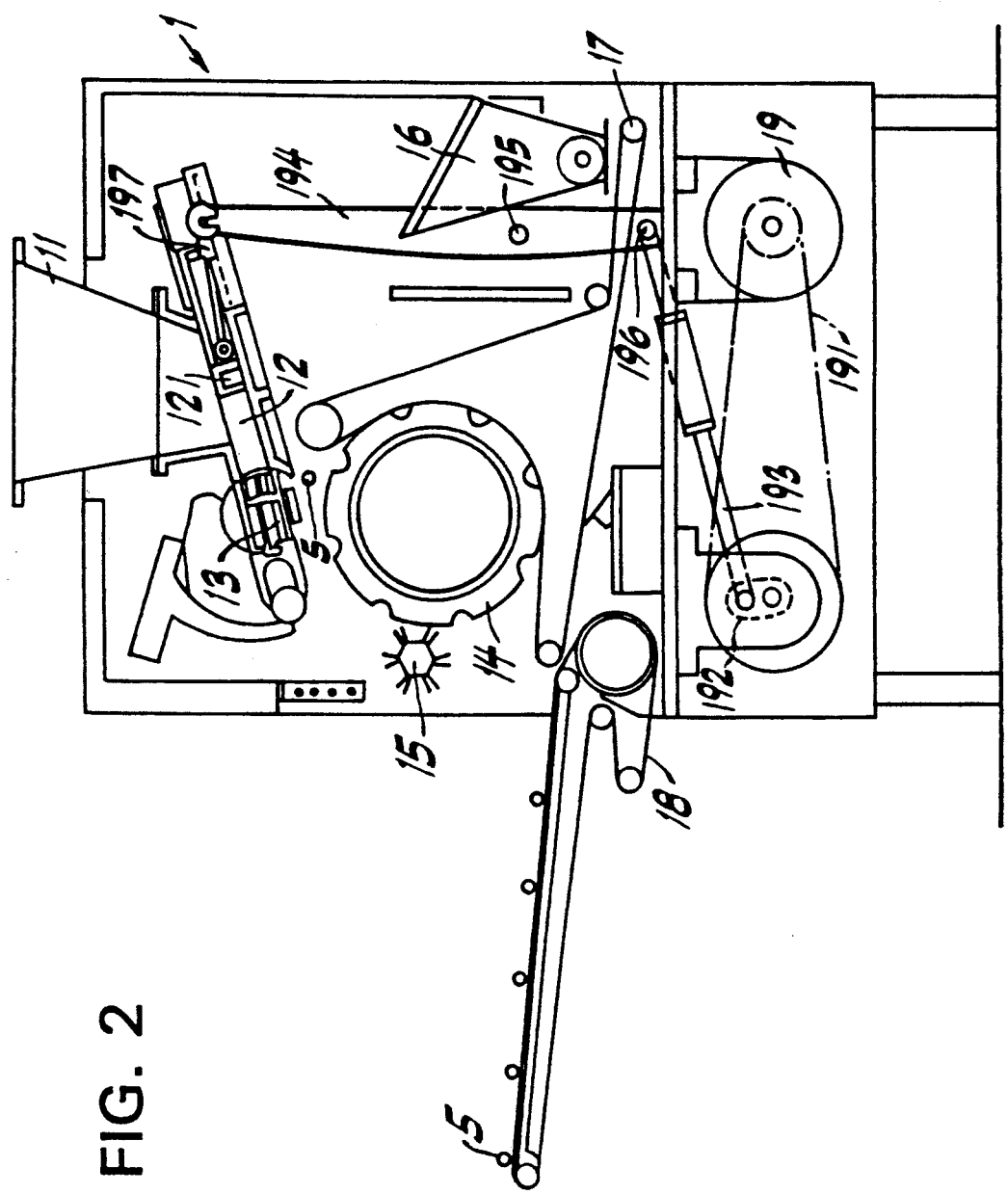
FIG. 2 is a diagrammatic illustration of the head machine with its dough divider and rounder.
Figure 3:
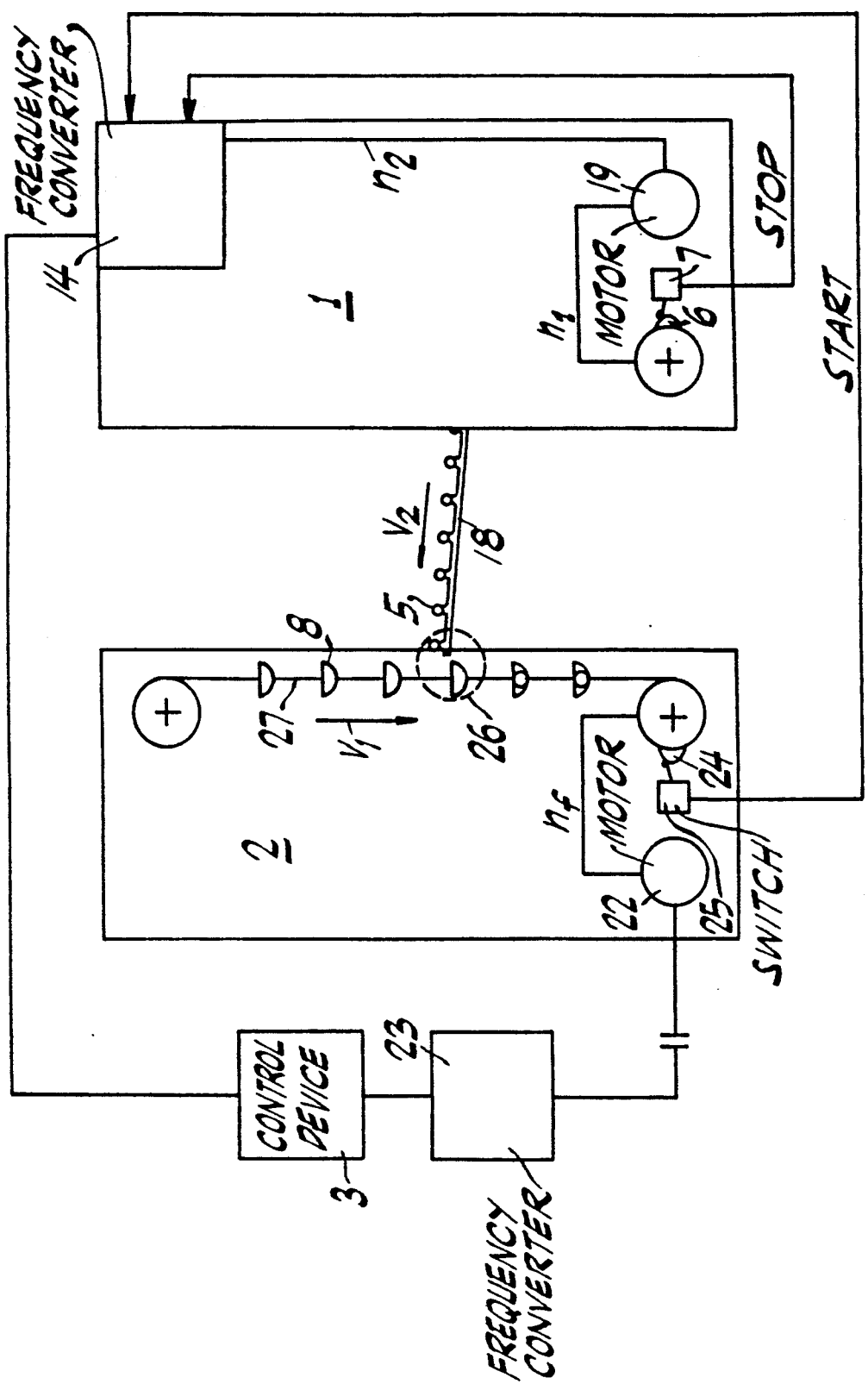
FIG. 3 is a circuit diagram of a circuit for controlling the drive of the head machine and the dough fermentation chamber.

Referring to FIG. 2, the dough mass is introduced into a hopper 11 of a dough divider in which a piston 12 presses dough into a rotary valve measuring unit 13 from which the dough pieces are individually and successively discharged into a shaping device comprising a drum rounder 14 on which passes a belt 17. The shaped dough pieces 5 are delivered by the belt 17 to a distributor belt 18 and the dough pieces are conveyed to a transfer station 26 in the chamber 2 where the pieces 5 are discharged into dough cups 8. The dough cups 8 are transported through the chamber 2 where the dough pieces 5 undergo fermentation after which the dough pieces are supplied to a baking oven (not shown).

Up to this point the construction is conventional and requires no further amplification.

In order to synchronize the operation of the head machine 1 with the fermentation chamber 2 for all operating conditions, particularly during initial start-up or restarting, the invention provides for specialized control of the drive of drive motors 19 and 22 of the head machine 1 and the fermentation chamber 2, respectively. The drive motor 19 of the head machine 1 drives the elements which control the operation of the dough divider, the drive 14 and the belts 17 and 18 so that the size of the dough pieces 5 and the speed of delivery thereof can be regulated. The drive motor 22 of the fermentation chamber controls the speed of travel of the dough cups 8 through chamber 2.

The drive motors 19 and 22 are controlled by respective frequency converters 4 and 23 which are connected to a control means 3, preferably in the form of a memory programmable control SPS.

The control means 3 is connected to the frequency converter 23 to assign the operating frequency, and corresponding operating speed $V_1$, to the frequency converter 23 whereby the motor 22 will operate at speed $V_1$. This is expressed as follows: Various frequencies can be set in the frequency converter 23 and a different operating speed $V_1$ of motor 22 is associated with each frequency. Different programs can be stored in the control means 3 and a different frequency is associated with each program.

In the same way, the control means 3 is connected to the frequency converter 4 of the head machine for controlling the operating speed $V_2$ of motor 19. Furthermore, it is also possible for the control means 3 to activate a set of parameters from the frequency converter 4 for making the operating cycle of the head machine 1 operate with this set of parameters. The selected operating parameters determine the type of operating cycle.

Figure 4:
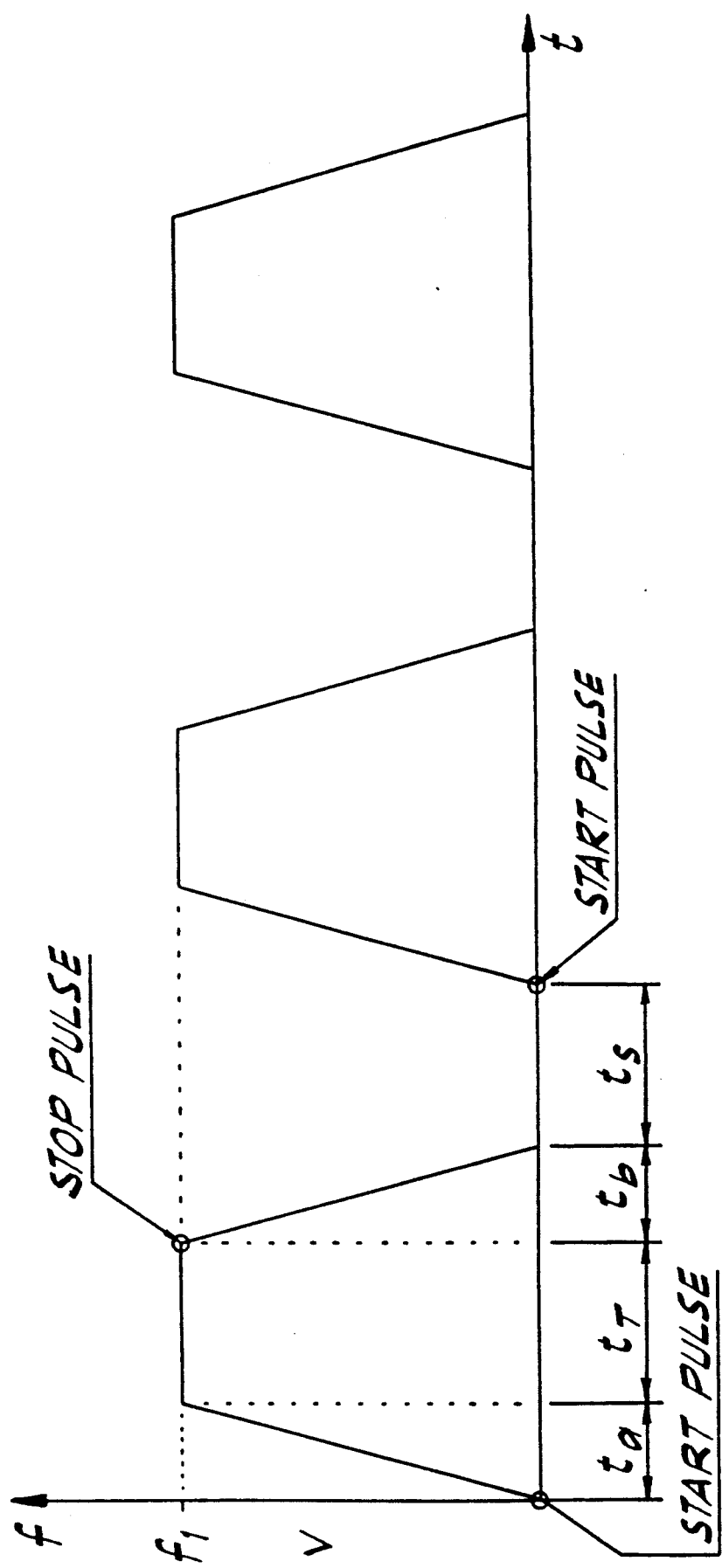
FIG. 4 is a graphical diagram of the time sequence in an operating cycle having intermittent pauses.
Figure 5:
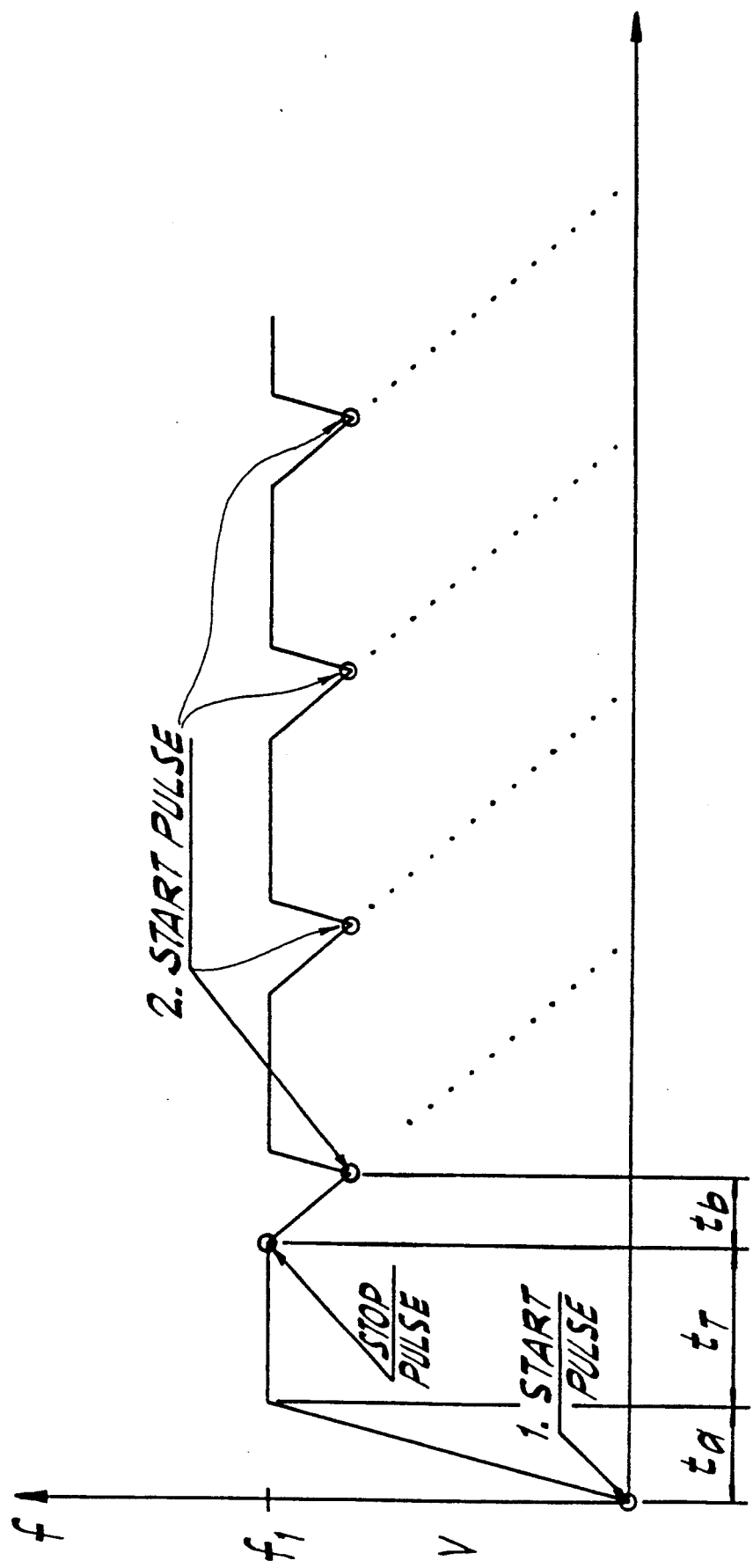
FIG. 5 is a graphical diagram of the time sequence of an operating cycle having intermittent periods of slow down but not stoppage.

When the drive in the fermentation chamber 2 is started, a switch 25 is actuated by a cam 24, depending on the position of the dough cups 8 at the transfer station 26. The actuation of the switch 25 produces a starting pulse which is supplied to frequency converter 4, causing the dough divider 1 then to start up. The dough divider then executes an operating cycle corresponding to Diagram 1 (FIG. 4) at the frequency set on the frequency converter 4 by the control means 3. In other words, the following occurs: After the starting pulse, the drive motor 19 accelerates within the start up time Ta along a starting slope to the output speed corresponding to the operating frequency $f_1$. The drive motor 19 operates at the output corresponding to this frequency until a stop switch 7 is actuated by a cam 6 operatively connected to the drive in the head machine 1, and a stop pulse is produced for a stopped period. The drive motor 19 then slows down at a deceleration rate stored in the frequency converter 4, toward a complete halting. The time ts of halting is governed by the total time of the intervals ta, tT, and tb and the time remaining from the speed $V_1$ in the fermentation chamber 2 before the next starting pulse is triggered by the switch 25.

All of the parameters represented in Diagram 1 in this Start-Stop operation are variable. They can either be varied jointly in a set of parameters, or they can be adjusted individually. The set of parameters can also include: voltage change, current limitation, jog frequency, and minimum and maximum frequency values. The halt time ts between two successive cycles is likewise variable and is governed by the fermentation chamber 2. If the rates of acceleration and deceleration, i.e. the slopes of the curves in Diagram 1 during times ta and tb, respectively are chosen, for example, so that the total cycle time is longer than the cycle time available, the next starting pulse will arrive while the system is still in the deceleration state, i.e. along the deceleration slope in Diagram 1 in time interval tb. This situation is shown in Diagram 2. Therein, an operation is obtained which is almost continuous between the start and stop signals. Thus, the loads on the machine are minimized, dough production is optimized, and delivery accuracy is maximized.

To achieve the same operating speeds of the belts 18 and 27 and thereby of the dough pieces 5 and the dough cups 8, the frequencies in the frequency converters are set so that the speeds $V_1$ and $V_2$ are matched at the transfer station 26, so that it is always possible to transfer the dough piece 5 with precision since the starting of the dough divider 1 is initiated in each case as a function of the drive of the fermentation chamber and hence of the position of the dough cups 8 at transfer station 26 and is controlled exactly by the adjustable operating cycle.

The control of the drive motor 19 in head machine 1, which also controls its output torque and its rate of increase, is transmitted to a delivery piston 121 of the dough divider by conventional transmission elements, including drive belt 191, crank mechanism 192, and rods 193, 194, 197 which produce a center of rotation 195 relative to a linkage point 196. The dough, drawn gently by a retraction movement of the piston 121 into a delivery chamber 12 from the dough hopper 11, is then pressed by the piston into measuring chambers of the rotary valve unit 13. Therefore, the acceleration time of the delivery piston 121 is regulated so that the pressure on the dough builds up slowly and the dough is appropriately pressed gently into the measuring chambers during the adjustable cycle time.

It is now possible with the operating system of the invention to make product-specific adaptations and thus to arrive at optimal dough results.

In the drive system of conventional dough dividers, the drive speed of the delivery piston is constant within each operating cycle. The delivery piston thus exerts its full pressure on the dough in a relatively short time interval and presses the dough into the measuring chamber. Since the frequency, acceleration time, cycle time, and deceleration time are not adjustable in this case, no adaptation to the dough can be made, and in particular no product-specific variations of the dynamic dough pressure are possible concurrently maintaining almost the full hourly output.

Ordinarily, when conventional dough dividers are modified due to changes in the equipment after the head machine, for example, due to longer fermentation periods, this is achieved by providing longer intervals between successive deliveries of dough or by changing the overall drive speed.

FIG. 2 illustrates a number of conventional elements in the head machine 1, including a flour spreader 16, cleaning brushes 15, and their drive mechanisms as well as the drive mechanisms for belts 17, 18 and rotary valve measuring unit 13. These conventional elements are not described in detail as their features are well known and not material to the invention.

It is to be understood that the drive means disclosed for the dough divider can also be used when the starting pulse is not initiated by the subsequent treatment device but, for example, as with manual removal of the dough pieces, when the individual parameters or sets of parameters are activated in the frequency converter from an interface of manually through a keyboard and the machine runs continuously or discontinuously (by electronic timer) with these operating data. The operating speed of the dough divider can be adapted to the work capacity of the operator with no problems, or to an outside accessory (a subsequent device from another company).

Although the invention has been described in conjunction with specific embodiments thereof, it will become apparent to those skilled in the art that numerous modifications and variations can be made within the scope and spirit of the invention as defined in the attached claims.

What is claimed is:

1. A process for controlling a head machine and a subsequent treatment device of a dough processing apparatus, comprising, producing in the head machine successive dough pieces, one after the next, conveying the dough pieces, one after the next, on a conveyor to a subsequent treatment device, receiving the dough pieces from said conveyor and transporting the dough pieces in the subsequent treatment device for treatment therein, effecting the transfer of the dough pieces from the head machine to the subsequent treatment device at a transfer station, driving the conveyor in the head machine by a first drive motor and effecting the conveyance of the dough pieces in the subsequent treatment device by a second drive motor, controlling the speed of said first drive motor in accordance with a frequency selected by a frequency convertor connected to the first drive motor, interrupting the drive of said first drive motor by a stop pulse when said conveyor is in a position for transfer of a dough piece to the subsequent treatment device, and sending a restart signal to said first drive motor when the subsequent treatment device is in a position to receive the dough piece from the head machine.

2. A process as claimed in claim 1, wherein during starting and restarting, said first drive motor undergoes acceleration and during interruption, said first drive motor undergoes deceleration, said process further comprising controlling rates of acceleration and deceleration of said first drive motor by the frequency convertor.

3. A process as claimed in claim 2, comprising controlling the speed of said second drive motor by a second frequency convertor, and controlling the first said frequency convertor and said second frequency convertor by a control means.

4. A process as claimed in claim 3, wherein said first and second frequency convertors are controlled by said control means for equalizing the speed of said conveyor of said head machine and the speed of transport in said subsequent treatment device at said transfer station.

5. A process as claimed in claim 3, wherein said control means comprises a memory-programmable control for activating a set of parameters in said first frequency convertor to control acceleration and deceleration rates and the operating speed of said first drive motor.

6. A process as claimed in claim 5, comprising controlling the time of acceleration and deceleration of said first drive motor by said frequency convertor.

7. A process as claimed in claim 6, wherein the acceleration time of said first drive motor is made relatively long for developing slow pressure build-up in a dough divider in said head machine driven by said first drive motor.

8. A process as claimed in claim 7, comprising bringing said first drive motor to a complete stop after deceleration for a period of time which is a function of the time of acceleration, running time of the motor and deceleration time in relation to an overall cycle time between successive restarting signals.

9. A process as claimed in claim 6, wherein the total of the acceleration time, the time of operation at operating speed and the deceleration time when compared to the time interval between successive restarting signals does not permit the first drive motor to come to a complete halt.

10. Dough processing apparatus comprising a head machine, including dough dividing means for producing dough pieces one after the other, conveyor means for conveying the dough pieces one after the other from the dough dividing means, and a first drive motor for driving the dough dividing means and the conveyor means; a subsequent treatment device for the dough pieces including transport means for receiving the dough pieces from said conveyor means at a transfer station and for transporting the dough pieces in said subsequent treatment device, and a second drive motor for driving said transport means; frequency convertor means connected to said first drive motor for controlling the speed of operation thereof based on a selected frequency from said frequency convertor means, first switch means for being operated to interrupt the drive of said first drive means when the conveyor means is in a position for transfer of a dough piece to said transfer means, and second switch means for sending a restart signal to said first drive means when said transport means is in a position to receive the dough piece from said conveyor means.

11. Apparatus as claimed in claim 10, comprising a second frequency convertor connected to said second drive motor to drive the same at a speed corresponding to a frequency selected by said second frequency convertor.

12. Apparatus as claimed in claim 11, comprising control means connected to the first said frequency convertor and to said second frequency convertor for controlling the speeds of said first and second motors so that at the time of transfer of said dough pieces at said transfer station, the speed of the conveyor means and the transfer means will be equalized.

13. Apparatus as claimed in claim 12, wherein said control means comprises a memory-programmable control for activating a set of parameters in said first frequency convertor to control acceleration and deceleration rates and the operating speed of said first drive motor.

14. Apparatus as claimed in claim 12, wherein said first switch means comprises a switch which is operated by said first drive means to send a signal to said first frequency convertor, which in turn sends a stop signal to said first drive means so that said dough pieces are on the conveyor means in a position to be transferred to said transport means.

15. Apparatus as claimed in claim 14, wherein said second switch means comprises a second switch which is operated by said second drive means to send a signal to said first frequency converter which in turn sends a restart signal to said first drive means when said transport means is in a position to receive the dough pieces from said conveyor means.

16. Apparatus as claimed in claim 10, wherein said dough dividing means comprises a delivery piston driven by said first drive motor, said frequency convertor controlling acceleration and deceleration of said drive motor during starting and stopping of said first drive motor, said delivery piston being driven by said first drive motor, during acceleration thereof, to apply gradually increasing pressure to the dough in the course of producing the dough pieces.

* * * * *